United States Patent [19]
Bakardjiev et al.

[11] Patent Number: 5,614,104
[45] Date of Patent: Mar. 25, 1997

[54] PROCESS AND APPARATUS FOR THE CONTINUOUS DETERMINATION OF THE SYLVINE SATURATION OF HOT SOLUTIONS FOR MONITORING AND CONTROLLING THE HOT SOLUBILIZING OF A CRUDE POTASH SALT

[75] Inventors: Ivan Bakardjiev, Hanover; Karl R. Wambach-Sommerhoff, Bad Hersfeld; Markus Cieslik, Wunstorf; Helmut Zentgraf, Burghaun-Steinback; Jost Gotte, Philippsthal; Stefan Dressel, Heringen, all of Germany

[73] Assignee: Kali Und Salz GmbH, Kassel, Germany

[21] Appl. No.: 399,726

[22] Filed: Mar. 7, 1995

[30] Foreign Application Priority Data

Mar. 9, 1994 [DE] Germany .................. 44 07 916.8

[51] Int. Cl.$^6$ ............................................. B01D 9/02
[52] U.S. Cl. .................... 210/742; 23/296; 210/774
[58] Field of Search .................... 210/634, 742, 210/774, 806; 23/296, 297, 299, 302 R; 423/181, DIG. 7, DIG. 14; 159/30, 45; 374/16, 25, 45

[56] References Cited

U.S. PATENT DOCUMENTS

| | | | |
|---|---|---|---|
| 2,927,010 | 3/1960 | Le Baron | 23/297 |
| 3,279,897 | 10/1966 | Goodenough et al. | 23/302 R |
| 3,359,076 | 12/1967 | Gaska | 23/302 R |
| 3,904,520 | 9/1975 | Dancy | 23/302 R |
| 3,994,531 | 11/1976 | Dillard et al. | 23/302 R |
| 4,224,036 | 9/1980 | Geesen | 23/302 R |
| 4,334,885 | 6/1982 | Harrison et al. | 23/302 R |
| 4,412,838 | 11/1983 | Ertl et al. | 23/302 R |
| 4,568,353 | 2/1986 | Hartmann et al. | 23/302 R |

OTHER PUBLICATIONS

Ullmann's Encyclopedia of Industrial Chemistry, 5th Edition, vol. A22, 1993, pp. 53–57.
Ullmann's Encyclopedia of Industrial Chemistry, vol. A 22, 5th Ed. Weinheim: Chemie, 1993, pp. 53, 54, 55.
Z. Angew. Phys. 27 (1969), No. 4, pp. 273–277, O. Kratky, H. Leopold and H. Stabinger ("Dichtemessungen . . . ").

*Primary Examiner*—Joseph W. Drodge
*Attorney, Agent, or Firm*—Collard & Roe, P.C.

[57] ABSTRACT

Process for determining the sylvine saturation in which the salt concentration in the solid matter-free crude solution through temperature determination at a temperature $T_M > T$, and subsequently after contacting with KCl at a temperature $T_{NS} > T$ and heating to $T_M$, is measured again, and from this data a saturation temperature $T_S$ is obtained. The temperature difference $T_S - T$ serves as a measure for the sylvine saturation degree. In this manner, the sylvine saturation degree can automatically be measured in intervals of seconds and can serve as a control value for the addition of crude salt in a hot solution process.

4 Claims, 3 Drawing Sheets

PROCESS AND APPARATUS FOR THE CONTINUOUS DETERMINATION OF THE SYLVINE SATURATION OF HOT SOLUTIONS FOR MONITORING AND CONTROLLING THE HOT SOLUBILIZING OF A CRUDE POTASH SALT

BACKGROUND OF THE INVENTION

1. Field of the Invention

The present invention relates to a process and apparatus for the continuous determination of the sylvine saturation of hot solutions for monitoring and controlling the hot solubilizing of a crude potash salt.

2. The Prior Art

The hot dissolution process is a treatment process customarily used in the potash industry for obtaining potassium chloride. In this process, the different dissolution behavior of halite, sylvine and primarily of kieserite is exploited.

The dissolving of the potassium chloride out of the crude salt is carried out with a hot so-called dissolving lye, which contains sodium chloride, potassium chloride, magnesium chloride and magnesium sulfate in different concentrations. In this connection, the solubility conditions are approximately represented by the quinary system:

$Na^+$, $K^+$, $Mg^{2+}$, $Cl^-$ and $SO_4^{2-}$; $H_2O$ (Ullmann's Encyclopedia of Industrial Chemistry, Vol. A 22, 5th Edition, Weinheim: Chemie, 1993, p. 53).

In this process, the dissolving lye quantity, which is maintained in circulation, is kept approximately constant, and the crude salt is metered in depending on the content of valuable product. From the hot crude solution obtained in this way, the KCl can be recovered by a fractionated crystallization process. The sylvine saturation degree (S.D.) of the crude solution is decisive for the amount of the potassium chloride yield. In the present case, the "S.D." is to be understood as follows: The relation between the KCl-concentration of the exclusively halite-saturated crude solution and a comparable solution additionally saturated with sylvine. In case the S.D. is too high, the potassium chloride is not completely dissolved out of the crude salt. This leads to losses of valuable product via the residue.

In case the S.D. is too low, the potassium chloride is dissolved out of the crude salt as far as possible; however, less valuable material is obtained per unit of dissolving lye. Furthermore, this leads to an undesirably high dissolution of rock salt.

According to the present state of the art, the hot dissolution process is controlled via physical methods of determination (temperature, density via areometer, radiometric potassium determination), and based on chemical analyses. For optimizing or controlling said process, said determinations are required in the shortest possible time intervals. For the determination of the density and for the chemical analysis of the solution, it is always necessary to obtain solutions that are free of solids. Based on the determinations carried out and the known solubility conditions of. the system specified above, it is possible to calculate the S.D. of the crude salt solution with respect to KCl. Even if the determinations could be automated completely, which has not as yet been realized worldwide in the potash industry, the result would hardly satisfy. The errors of all determinations required here, as well as the errors of the respective equilibrium values lead according to the error propagation law to a high inaccuracy of the computed value of the saturation degree.

In the trade journal "Z. angew. Phys." 27 (1969), No. 4, p. 273, O. Kratky, H. Leopold and H. Stabinger describe the use of highly sensitive sensors that are suitable for the determination of the concentration or density of gases and liquids. This measurement is based on the fact that a defined volume of the measured material participates in the undamped oscillation of a bending oscillator, whose natural frequency is changed by such participation.

SUMMARY OF THE INVENTION

It is an object of the present invention to determine the S.D. of the crude salt solution in the hot dissolution process, firstly automatically and secondly with such accuracy that the optimization or control of the process is possible.

A direct determination of the variable S.D. of a crude solution is the objective because this variable plays a key role for the entire process.

In the process described herein, the high sensitivity of vibration sensors is exploited for the density determination. However, the determination of the density alone, even if accomplished with very high accuracy, does not permit a clear characterization of the crude solution with respect to the degree of KCl-saturation because the remaining components are variable as well. For overcoming these problems, a differential measuring arrangement was used in this process.

The oscillation period of the solution to be tested is determined as a measured value at a temperature $T_M$, which is elevated vis-a-vis the temperature of the crude solution. Following contact of the crude solution with solid KCl at an after-saturation temperature $T_{NS}$, which is lower than $T_M$, and (approximating) adjustment of the solution equilibrium, the measurement is carried out again at temperature $T_M$. If the value of the second measurement is higher, the solution has absorbed KCl. This means that the solution to be tested is undersaturated with respect to KCl at temperature $T_{NS}$.

If the second value is lower, the solution has given off KCl. This means that the solution to be tested is oversaturated with respect to KCl at temperature $T_{NS}$. If the solution to be tested is saturated at temperature $T_{NS}$, no change is observed. From these measurements, it follows that it is possible with such a measuring arrangement to determine through the variation of $T_{NS}$ the temperature $T_S$ at which the solution is saturated with respect to KCl. The difference between $T_S$ and the temperature T of the crude solution (either overheating or cooling down of the solution to be tested) is closely related to the S.D. of the solution. In the determination of the S.D. in this way, namely by T and $T_S$, a significantly higher accuracy is achieved according to the invention than heretofore in the prior art.

In accordance with this objective, an apparatus was developed for controlling the hot dissolution in the recovery of potassium chloride.

Other objects and features of the present invention will become apparent from the following detailed description considered in connection with-the accompanying drawing and the example which discloses the embodiment of the present invention. It should be understood, however, that the drawing and example are designed for the purpose of illustration only and not as a definition of the limits of the invention.

DETAILED DESCRIPTION OF PREFERRED EMBODIMENTS

Figure 1:
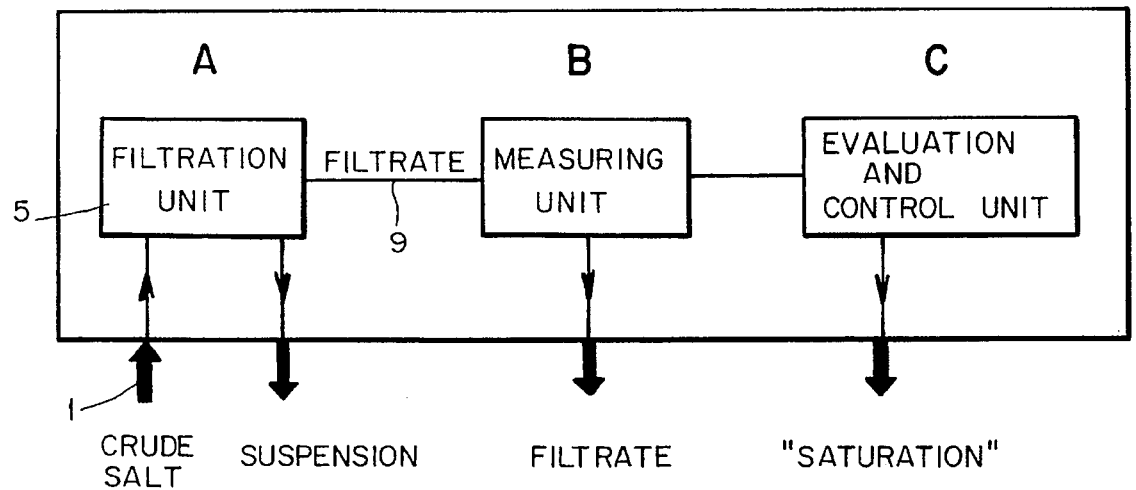
FIG. 1 shows a plan view of the apparatus which comprises a filtration unit device A, a measuring unit device B, and an evaluation unit device C.
Figure 2:
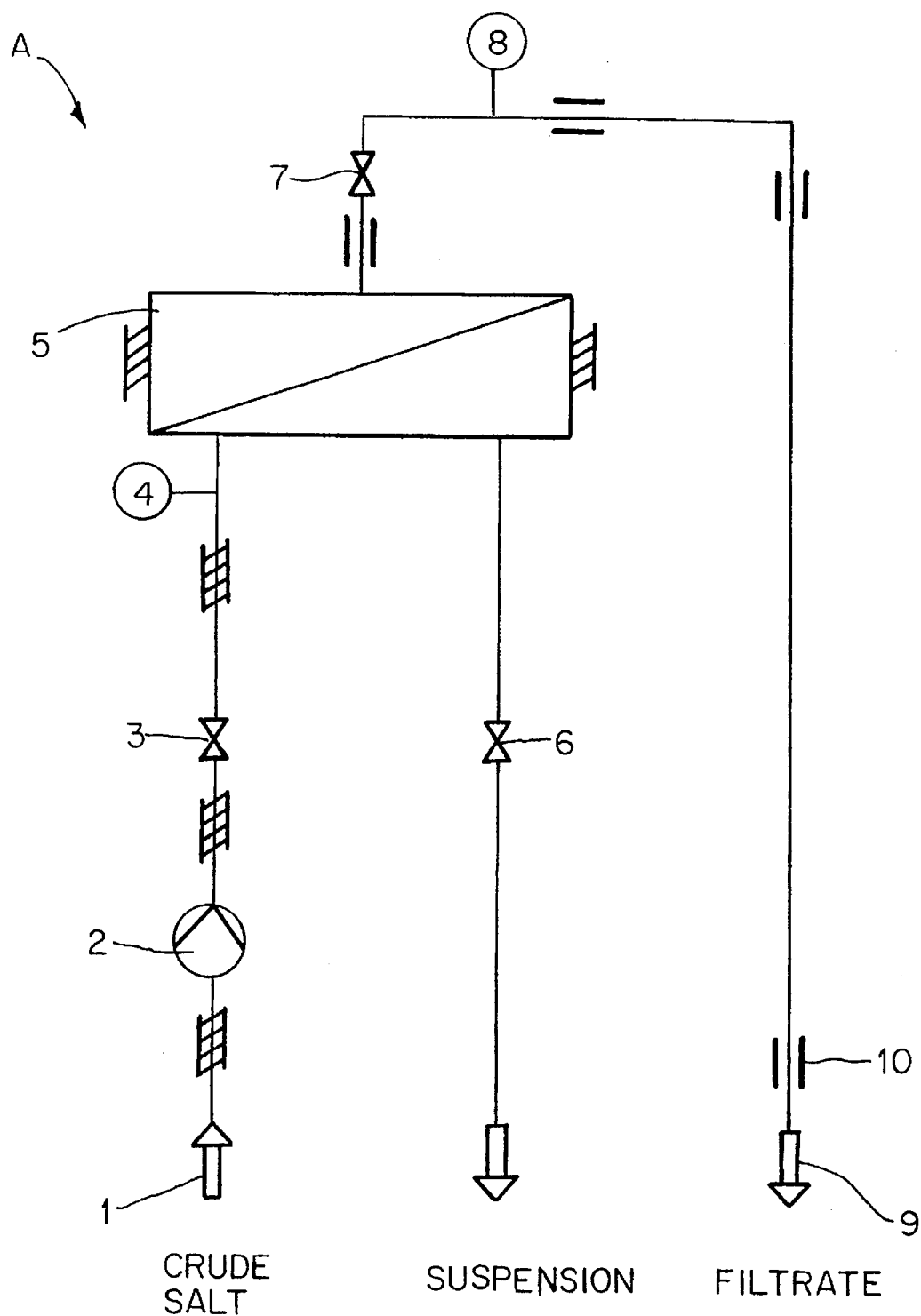
FIG. 2 shows a flow diagram for the filtration unit device.

Turning now in detail to the drawings, FIGS. 1 and 2 illustrate filtration unit A and show crude salt stream 1 being withdrawn from the dissolving apparatus via the pump 2 and supplied to the filter 5 via the valve 3. A suitable pressure is adjusted with the help of valve 6, causing filtrate 9 to flow via the valve 7. The desired flow of filtrate, which is measured with the flow-through meter 8, is adjusted via the pressure adjustment and by means of the valve 7.

The filtrate 9, immediately after leaving the filter 5, is heated with the help of the heat source 10 to a few degrees above the temperature measured at the thermometer 4. This heating is accomplished by passing the filtrate through a double-wall pipeline heat exchanger that is heated with a suitable heat transfer medium, for example glycerin.

Suitable filter cloths or diaphragms for filter 5 can be selected as the filter medium depending on the temperature and grain size distribution of the solid matter present in the crude salt solution.

Figure 3:
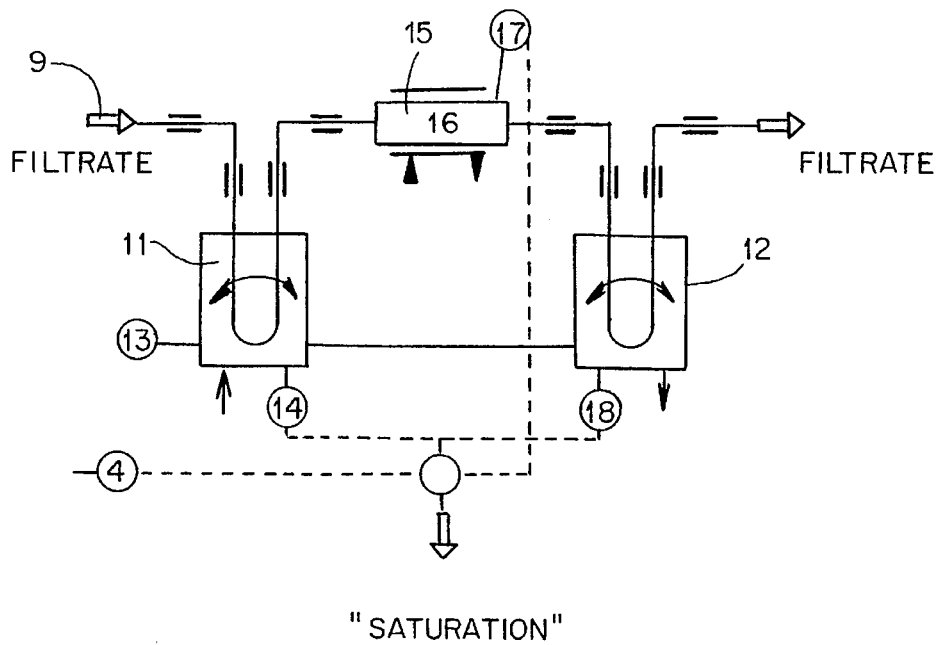
FIG. 3 shows a flow diagram for the measuring unit device.

FIG. 3 shows a flow diagram of the measuring unit device B.

The heated filtrate 9 is received in the first measuring cell 11, which exactly like the second measuring cell 12 is maintained at a temperature (measured at 13) above the temperature of the thermometer 4. In the measuring cell 11, the filtrate is tested by means of the sensors used, and the measured value 14 is obtained. Subsequently, the filtrate passes through a saturation column 15, which is filled with KCl 16 as a solid.

The column is maintained at a temperature 17, which is near the expected saturation temperature. Here, the filtrate will absorb or give off a precipitate depending on the KCl saturation degree, or it exits from the saturation column 15 unchanged.

In the second measuring cell 12, the solution is measured again with the same accuracy as before, and the measured value 18 is obtained. Subsequently, the filtrate exists from the measuring device and it can be returned to the dissolution apparatus.

The evaluation device C includes a computer, which determines the saturation temperature $T_S$ based on the measured values of the two cells and the temperature $T_{NS}$. Based on the difference between the temperature T of the crude solution and the saturation temperature $T_S$, the S.D. of the crude salt solution with respect to KCl is determined at second intervals.

The process according to the invention will now be further illustrated by reference to the following example.

EXAMPLE

Figure 4:
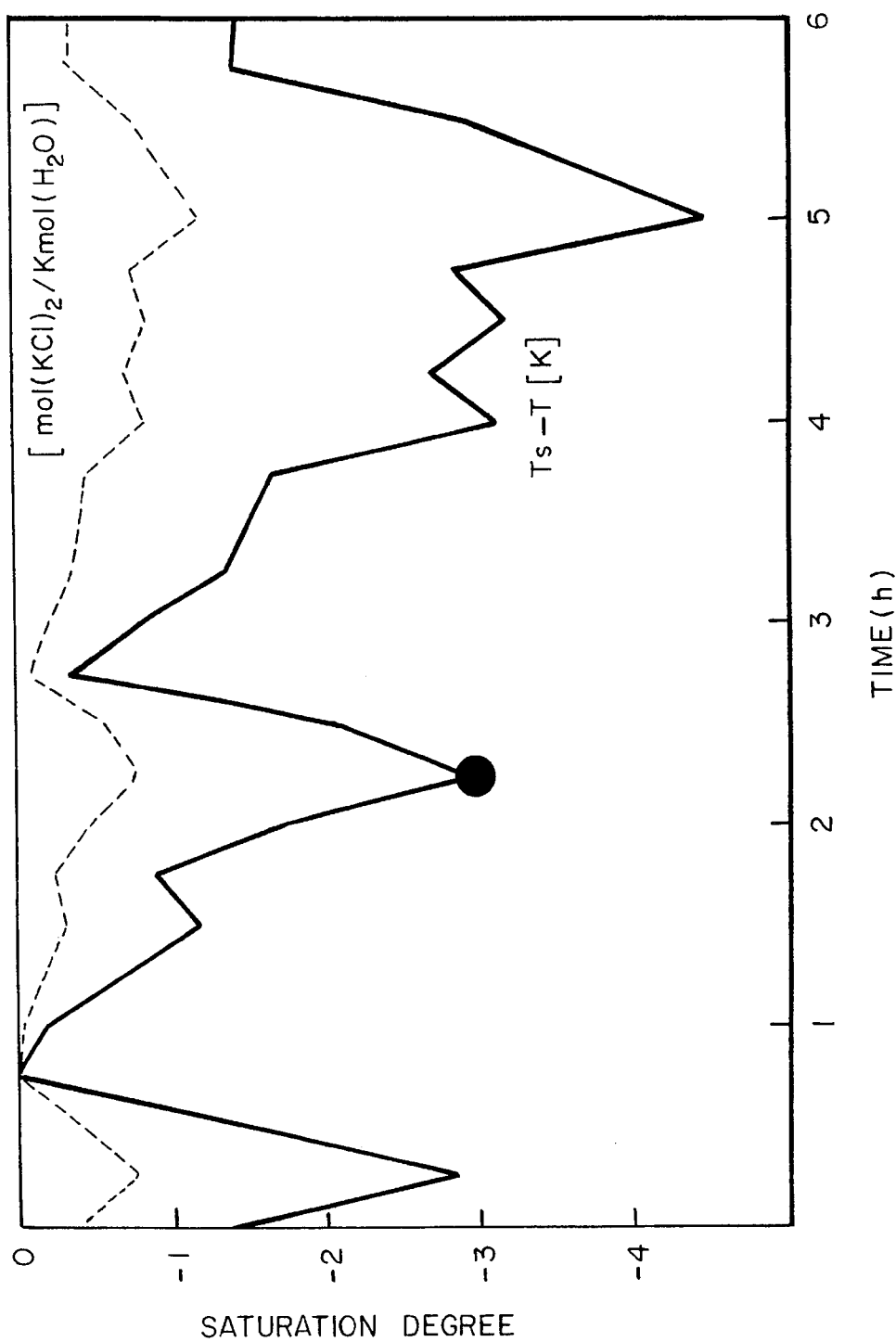
FIG. 4 shows the fluctuation of the S.D. of the hot solution in the processing of a crude potash salt over a duration of 6 hours for the Example of the invention.

The fluctuation of the S.D. of the hot solution in the processing of a crude potash salt is shown in FIG. 4 over a duration of 6 hours. The value indicated in FIG. 4 for the time 2 hours and 15 minutes has been determined as follows:

At this time, the crude solution had the temperature of 91.20° C. and first passed through the filtration unit A. Following heating, the temperature determination showed a $T_M$ of 92.88° C. At this temperature, the time for 500 oscillations at the first sensor 11 came to 1.6989679 seconds. After cooling to $T_{NS}$ of 88.43° C. the solution was contacted in the after-saturation column with said potassium chloride.

The second sensor 12 then showed a value of 1.6988850 seconds for 500 oscillations; thus the change amounted to Δ of −0.0000829 second which is an indication of the fact that the solution gave off potassium chloride. Because of the calibration of the sensors used with the solution to be tested, the saturation temperature can be computed as follows:

$$T_S = T_{NS} + 4306.076 \times (t_2 - t_1),$$ whereby $t_2-t_1$ represents the time difference of the two sensors.. In the present case, a temperature $T_S$ of 88.27° C. is determined. The temperature $T_S$–T as measure for the saturation amounts to 88.27−91.20 equals −2.93 K. With a multiplication factor of:

$$0.27 \text{ mol}(KCl)_2/\text{kmol}(H_2O).K$$

it is possible to compute by means of a correlation with the associated chemical analyses the concentration difference Vis-a-vis the comparative solution, which is also saturated with sylvine in addition to halite.

While one embodiment of the present invention has been shown and described, it is to be understood that many changes and modifications may be made thereunto without departing from the spirit and scope of the invention as defined in the appended claims.

What is claimed is:

1. Process for the continuous determination of the sylvine saturation degree (S.D.) of a hot solution for monitoring and controlling the hot solubilizing of a crude potash salt comprised in the solution, comprising:

(a) continuously obtaining solid matter-free filtrate solution from a stream of crude solution obtained from hot solubilizing of crude potash salt comprising sylvine while maintaining a dissolution temperature T of the solution;

(b) heating said filtrate solution to a temperature $T_M$ higher than T, and measuring the total concentration of the solute;

(c) subsequently cooling the solution to a temperature $T_{NS}$, which is lower than the temperature T of the crude solution, and contacting the cooled solution with solid potassium chloride; and (d) after increasing the temperature to the value $T_M$ of the first measurement, recording the total concentration of the reheated solution to result in a second measurement, and the first and second measurements being obtained by a measuring device;

(e) determining a temperature $T_S$, the latter being referred to as the saturation temperature of the crude solution with respect to potassium chloride, said temperature resulting from the sum of the temperature $T_{NS}$ and the difference between the first and the second measured concentrations multiplied by a calibration constant of the measuring device used, whereby the difference between the temperature $T_S$ so determined and the original temperature T of the crude solution serves as the determination of the sylvine saturation degree; and (f) utilizing the determined sylvine saturation degree for optimizing or controlling the hot solubilizing process.

2. Process according to claim 1, comprising adjusting the measuring temperature $T_M$ upwardly such that $T_M$ is higher than the temperature T of the salt solution so that the solution is unsaturated with respect to KCl.

3. Process according to claim 1, comprising adjusting the temperature $T_{NS}$ to the saturation temperature $T_S$.

4. Process according to claim 1, comprising determining density as a measure for total concentration of the solute.

* * * * *